(12) United States Patent
Parulski et al.

(10) Patent No.: US 7,034,871 B2
(45) Date of Patent: Apr. 25, 2006

(54) CAPTURING DIGITAL IMAGES TO BE TRANSFERRED TO AN E-MAIL ADDRESS

(75) Inventors: Kenneth A. Parulski, Rochester, NY (US); Joseph Ward, Hilton, NY (US); Michael C. Hopwood, Mountain View, CA (US)

(73) Assignee: Eastman Kodak Company, Rochester, NY (US)

( * ) Notice: Subject to any disclaimer, the term of this patent is extended or adjusted under 35 U.S.C. 154(b) by 1094 days.

(21) Appl. No.: 09/821,152

(22) Filed: Mar. 29, 2001

(65) Prior Publication Data

US 2001/0019359 A1 Sep. 6, 2001

Related U.S. Application Data

(63) Continuation of application No. 08/977,382, filed on Nov. 24, 1997.

(51) Int. Cl.
*H04N 5/76* (2006.01)

(52) U.S. Cl. .................................. 348/231.3; 348/231.2
(58) Field of Classification Search ............ 348/231.99, 348/231.2, 231.3, 231.7, 231.9, 231.1; 358/1.9, 358/1.15, 1.16, 906; 347/2
See application file for complete search history.

(56) References Cited

U.S. PATENT DOCUMENTS

| 4,965,626 | A | | 10/1990 | Robison et al. |
| 5,528,293 | A | | 6/1996 | Watanabe |
| 5,806,005 | A | * | 9/1998 | Hull et al. .................. 455/566 |
| 6,167,469 | A | * | 12/2000 | Safai et al. ..................... 710/62 |
| 6,226,362 | B1 | * | 5/2001 | Gerszberg et al. ....... 379/88.13 |
| 6,344,875 | B1 | * | 2/2002 | Hashimoto et al. ...... 348/207.1 |
| 6,427,078 | B1 | * | 7/2002 | Wilska et al. ............ 455/550.1 |
| 6,573,927 | B1 | * | 6/2003 | Parulski et al. ............... 348/32 |
| 6,642,959 | B1 | * | 11/2003 | Arai ......................... 348/231.3 |
| 6,683,649 | B1 | * | 1/2004 | Anderson .............. 348/333.05 |
| 6,784,924 | B1 | * | 8/2004 | Ward et al. .............. 348/207.1 |
| 6,812,962 | B1 | * | 11/2004 | Fredlund et al. ......... 348/231.2 |

FOREIGN PATENT DOCUMENTS

| EP | 0 548 597 A1 | 6/1993 |
| EP | 0 730 368 | 9/1996 |
| GB | 2 289 555 | 11/1995 |
| JP | 6-8537 | 1/1994 |
| JP | 8-18911 | 1/1996 |
| JP | 8-95163 | 4/1996 |

\* cited by examiner

*Primary Examiner*—Wendy R. Garber
*Assistant Examiner*—Jacqueline Wilson
(74) *Attorney, Agent, or Firm*—Pamela R. Crocker

(57) ABSTRACT

An electronic still camera for capturing images to be transferred to at least one e-mail address is disclosed. The electronic still camera includes an image sensor for capturing a plurality of images of scenes and for producing image signals representative of the corresponding scenes; an analog-to-digital converter for digitizing the image signals to produce digital images; and a removable memory card for storing a plurality of digital image files corresponding to the digital images. The electronic still camera also includes an internal memory for storing at least one digital image to be displayed and a plurality of e-mail addresses; a processor for controlling the transfer of the digital images from the removable memory card to the internal memory and for producing a utilization file; and a display coupled to the internal memory for displaying at least one digital image. The electronic still camera further includes a user interface for selecting at least one e-mail address and for scrolling through the plurality of digital images stored on the removable memory card in order to display and select particular digital images to be transferred to the selected at least one e-mail address, wherein the utilization file includes the at least one selected e-mail address and the name of at least one digital image file to be transferred to the at least one selected e-mail address and the processor stores the utilization file on the removable memory card separate from the digital image files.

21 Claims, 5 Drawing Sheets

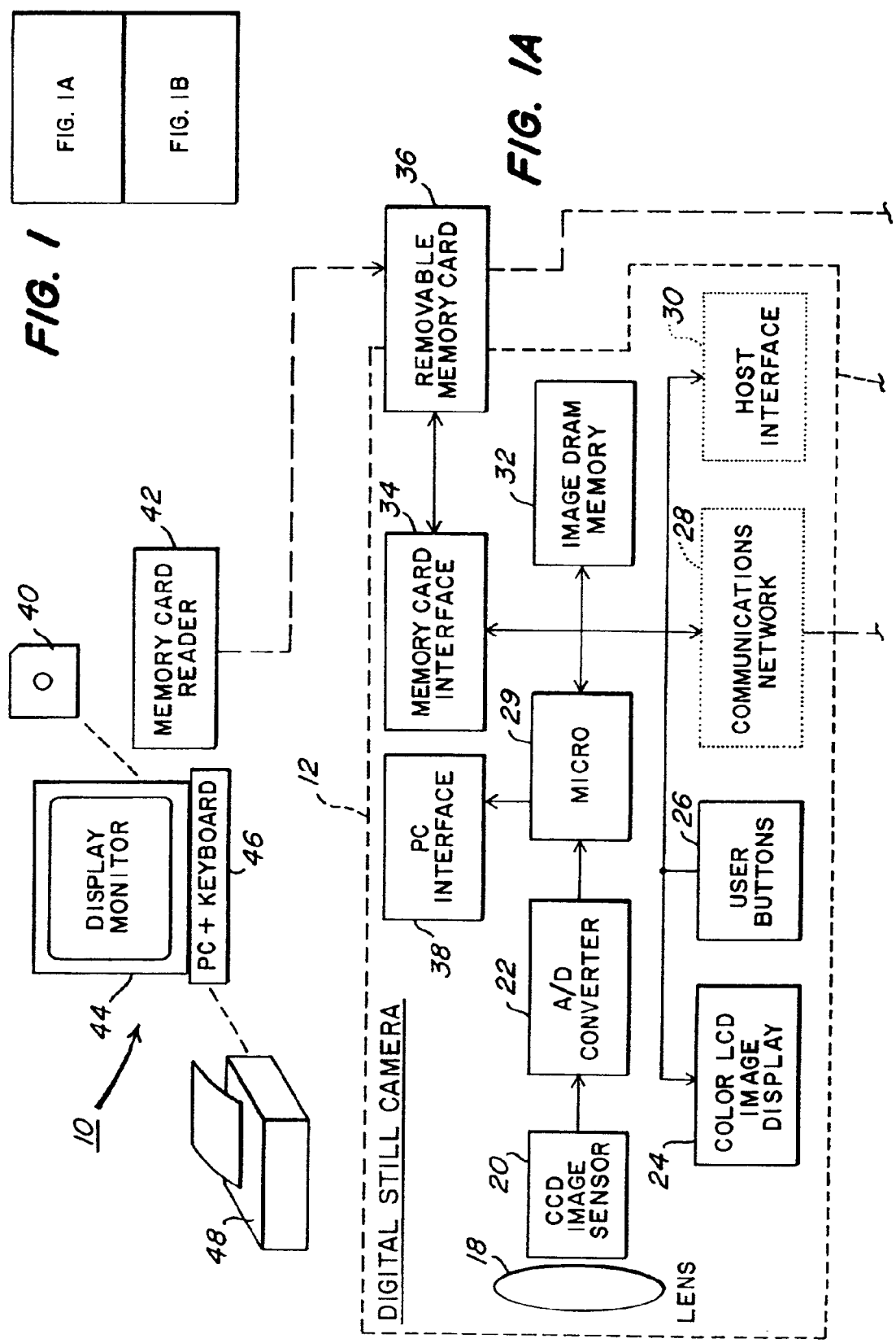

| — GLOBAL INFORMATION — |
| (CUSTOMER NAME, ADDRESS, BILLING INFO, ORDER DATE) |
| — PRINT ORDER INFO — |
| (SIZE, NUMBER OF COPIES, IMAGE REFERENCES) |
| — E-MAIL ORDER INFO — |
| (E-MAIL ADDRESS, IMAGE REFERENCES) |
| — ALBUM ORDER INFO — |
| (ALBUM HEADING, ACCESS, IMAGE REFERENCES) |
| — CREATIVE DETAIL — |
| (TEMPLATE, USER TEXT, IMAGE REFERENCE, IMAGE CROPPING) |
| — IMAGE REFERENCES — |
| (IMAGE FORMAT, IMAGE LOCATION) |

US 7,034,871 B2

CAPTURING DIGITAL IMAGES TO BE TRANSFERRED TO AN E-MAIL ADDRESS

CROSS-REFERENCE TO RELATED APPLICATION(S)

Reference is made to commonly assigned copending applications Ser. No. 09/004,046, entitled "Network Configuration File for Automatically Transmitting Images from an Electronic Still Camera" filed Jan. 7, 1998 in the names of Joseph Ward, Kenneth A. Parulski, and James D. Allen, and this application is a continuation of U.S. application Ser. No. 08/977,382, filed Nov. 24, 1997 entitled Electronic Camera With "Utilization" Selection Capability by Kenneth A. Parulski et al.

FIELD OF THE INVENTION

The invention relates generally to the field of photography, and in particular to electronic photography. More specifically, the invention relates to an electronic camera that can be interfaced with a host computer.

BACKGROUND OF THE INVENTION

Digital cameras, such as the Kodak Digital Science DC25™ camera, allow images to be utilized on a home computer (PC) and to be incorporated into e-mail documents and personal home pages on the World Wide Web. Presently, if a print is desired, each image must first be copied to the PC and then individually printed. The user is required to manually select each image to be printed, and manually decide how big each print should be and how many prints to make of each image.

In addition, it is possible for users to electronically send images to others using software, such as the Kodak Digital Science Picture Postcard Software™. However, this again requires the user to manually download each image to the host computer, select each image to be transmitted, and create a new "Postcard" for each image to be sent. Users can also create "albums" of photos on their computers using software such as the Family Album Creator™ by Creative Wonders, Inc. Again, however, this is a manual process that requires each image to be downloaded to the computer, individually selected, and added to the album.

In U.S. Pat. No. 5,241,659, reprint information can be generated at the time a PhotoCD disc is played back. This patent describes an EEPROM card that can be inserted into a PhotoCD player. As shown in FIGS. 3, 5, and 6 of this patent, the EEPROM card can contain reprint order information and "album disc" information input by the player operator. However, this information is not generated at the time of picture taking, and is not stored on the same media as the images. Moreover, the reprint information does not include information useful to the service provider, such as user account, charge card, and mailing address.

What is needed is a way for camera users to quickly and easily compose "print orders" and "transmission orders" and/or "electronic albuming" orders, at the time they capture their images.

SUMMARY OF THE INVENTION

Accordingly, it is an object of the present invention to provide an electronic still camera for capturing images to be transferred to at least one e-mail address, the electronic still camera comprising:

(a) an image sensor for capturing a plurality of images of scenes and for producing image signals representative of the corresponding scenes;

(b) an analog-to-digital converter for digitizing the image signals to produce digital images;

(c) a removable memory card for storing a plurality of digital image files corresponding to the digital images;

(d) an internal memory for storing at least one digital image to be displayed and a plurality of e-mail addresses;

(e) a processor for controlling the transfer of the digital images from the removable memory card to the internal memory and for producing a utilization file;

(f) a display coupled to the internal memory for displaying at least one digital image; and (g) a user interface for selecting at least one e-mail address and for scrolling through the plurality of digital images stored on the removable memory card in order to display and select particular digital images to be transferred to the selected at least one e-mail address, wherein the utilization file includes the at least one selected e-mail address and the name of at least one digital image file to be transferred to the at least one selected e-mail address and the processor stores the utilization file on the removable memory card separate from the digital image files.

DETAILED DESCRIPTION OF THE INVENTION

Because imaging systems and devices are well known, the present description will be directed in particular to elements forming part of, or cooperating more directly with, apparatus in accordance with the present invention. Elements not specifically shown or described herein may be selected from those known in the art. Some aspects of the present description may be implemented in software. Unless otherwise specified, all software implementation is conventional and within the ordinary skill in the programming arts.

Figure 1B:
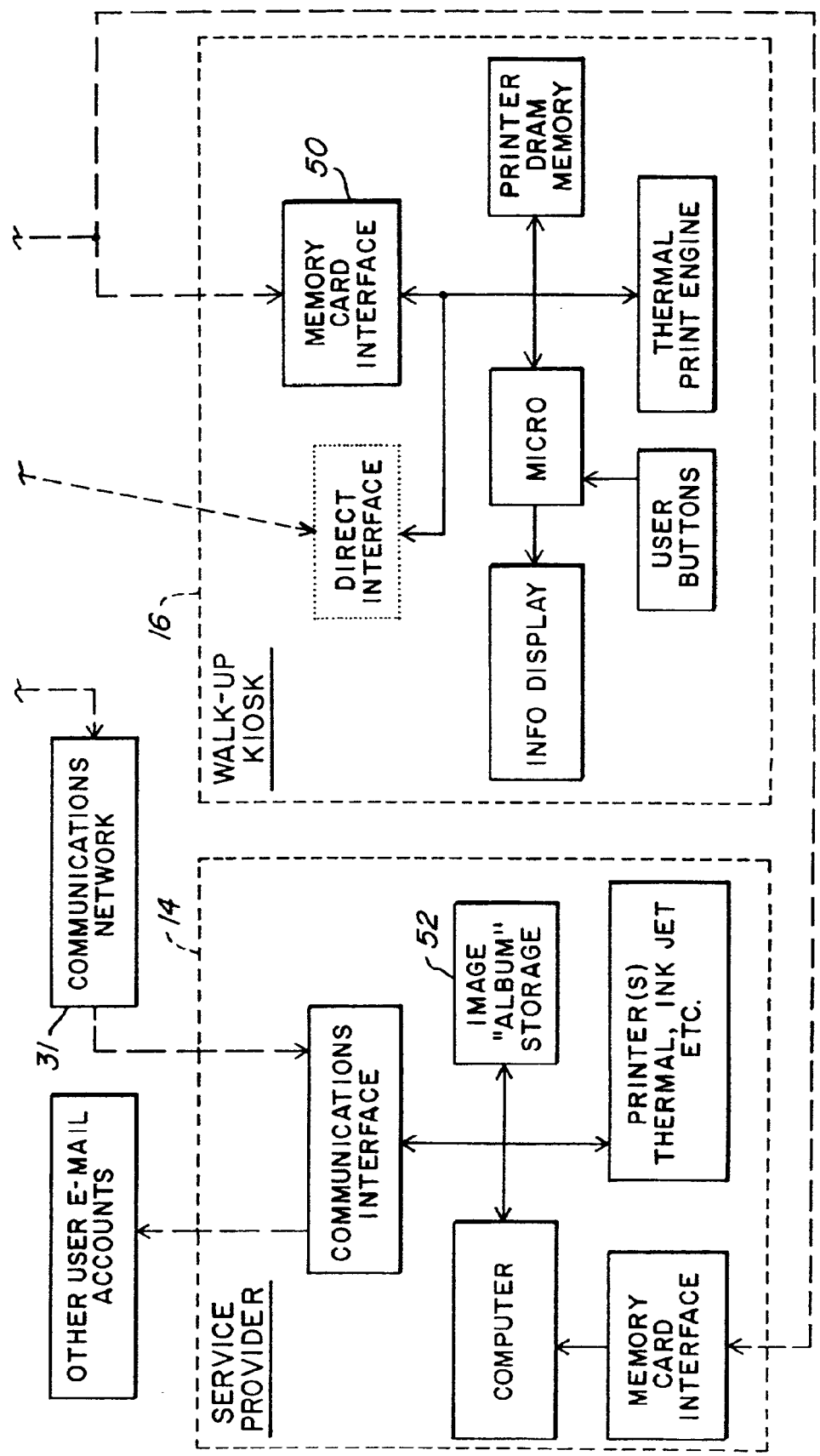
FIG. 1 is a block diagram of the system according to the invention.

A system block diagram of the invention is shown in FIG. 1, and includes a user's host computer (PC) 10, a digital camera 12, equipment located at a "downstream" service provider 14, and equipment at a walk-up kiosk 16. The camera 12 includes an optical section 18 for imaging a scene upon an image sensor 20 and generating an image signal, an A/D converter 22 for digitizing the image signal, a liquid crystal display (LCD screen) 24 for displaying images and other information, a number of user input buttons 26, and both internal memory 32 and a removable memory card 36 for storing captured images. The camera 12 may optionally include an internal communications interface 28 (e.g., modem). A microprocessor 29 generally controls the operation of the camera 12, and interchanges data through a memory card interface 34 with the memory card 36, through a PC interface 38 with the host computer 10, through a host interface 30 directly with the kiosk 16, and through the communications interface 28 and a communications network 31 with the service provider 14.

When the camera 12 is purchased, it is provided with a software application (located on a disc 40) for running on the user's host PC 10 that enables the user to specify the name(s) of downstream service providers, network addresses (friends, family or business associates) and related account information such as billing information (e.g., charge card number, mailing addresses). The user can also select, through the software application, one or more "creative backgrounds" offered by the service provider (such as a postcard border) and enter one or more text messages, (such as "Hi, I'm having a relaxing vacation, John Smith"), as will be described in connection with FIG. 3. All of this information can then be downloaded, via a memory card reader 42 on the host PC 10, to the removable memory card 36, which can be subsequently inserted into the camera 12. Alternatively, the information can be downloaded to the camera 12 via the host PC interface 38 and written to the camera's internal memory 32 or the removable memory card 36 in the camera. Typically, keyword descriptors accompany the information to enable easy access by the camera user.

Figure 2:
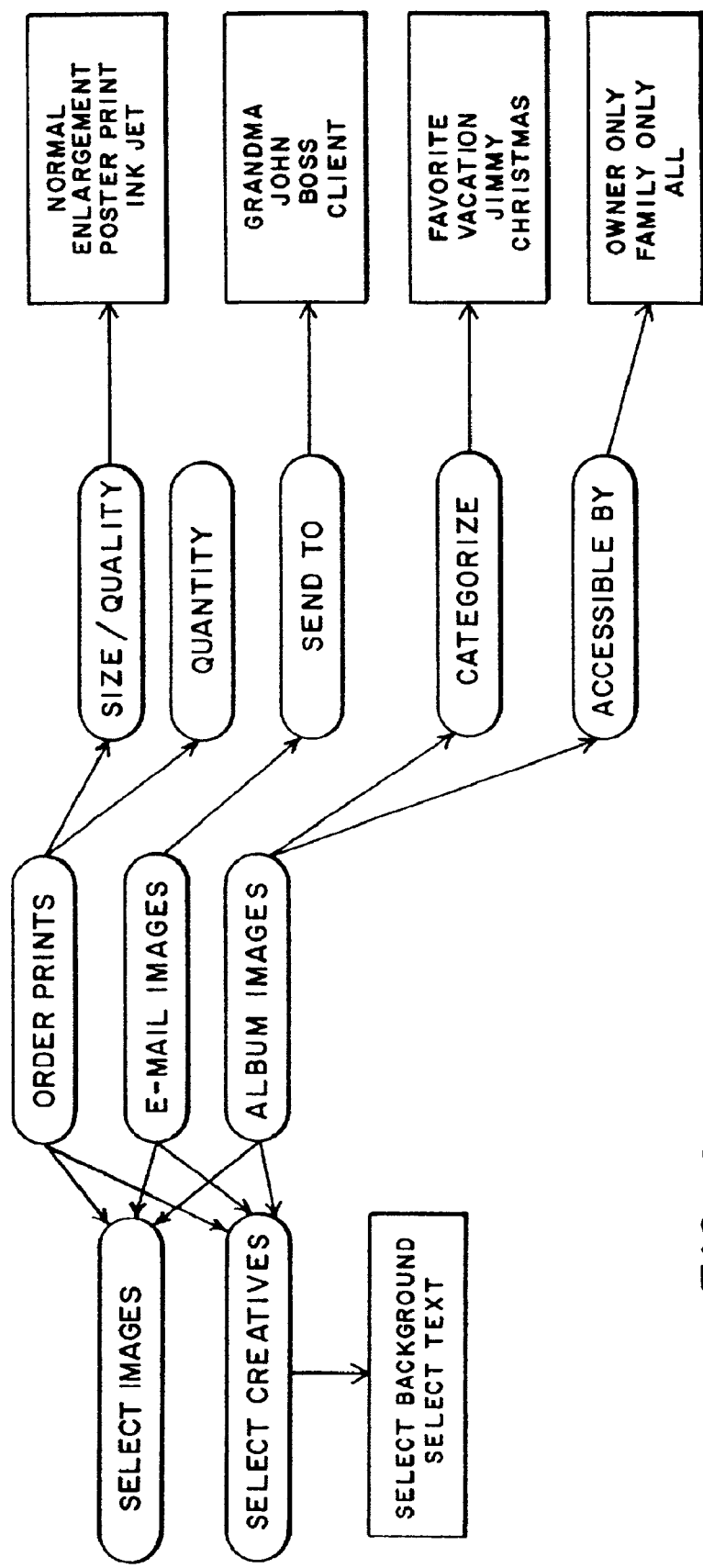
FIG. 2 is a diagram of downstream services available in the system shown in FIG. 1.

After placing the memory card 36 in the camera 12 (or disconnecting the camera 12 from the host PC 10), the user can operate the camera 12 to take numerous pictures, which are stored either in the internal memory 32 or in the memory card 36 (or in both). After taking pictures, the user reviews the images on the LCD screen 24, using the buttons 26 to scroll through the images. The user can then select the desired "downstream services" (printing, e-mailing, and/or albuming) and compose the order using the options listed in FIG. 2. These services and options are accessed from the memory card 36 and, for example, the keyword descriptors are assembled in a menu and displayed on the LCD screen 24. Selections among these services and options are made, for example, by reference to the keyword descriptors and actuation of the user buttons 26. The details of the order information is written into a "utilization" file generated by the camera 12 that identifies the order and includes pointers to the image files that store the images required to "fulfill" the order. The "utilization" file is stored in the internal memory 32 or the memory card 36.

Figure 3:
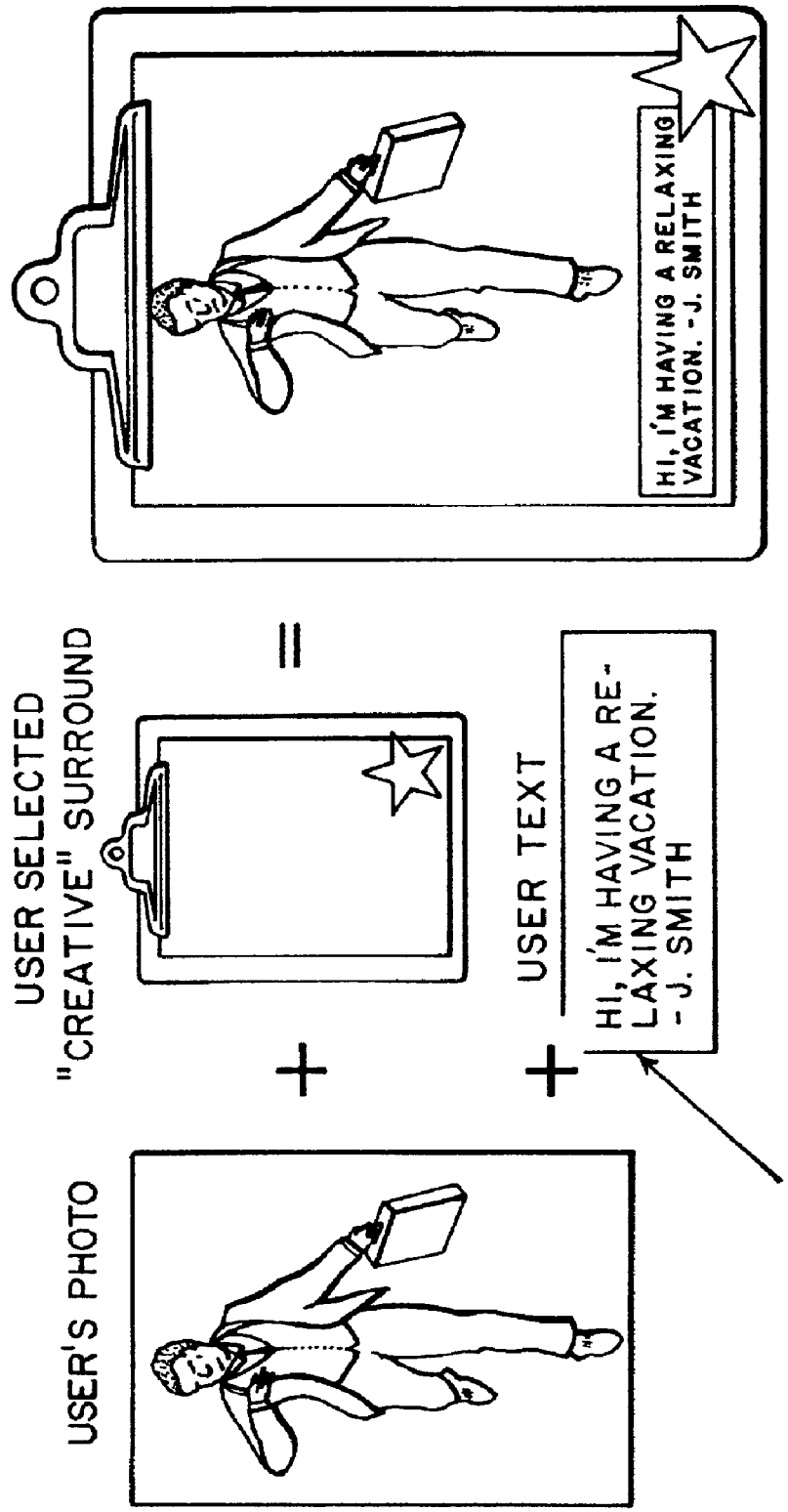
FIG. 3 is an illustration of one example of a creative background added to an image.

For printing, order composition involves selecting the quantity, print size, and quality level (e.g., thermal or ink jet) of the images to be printed. For example, the user might choose one "standard" (4"×6" size) image of 2 different images, and 2 standard size images plus one "enlargement" (8"×10" size) image of their "favorite" vacation image. The print order information is provided in the utilization file that identifies the order and includes pointers to the image files that store the images required to "fulfill" the print order. In addition to "normal" type prints, the prints can be "creative" prints, using one of the creative backgrounds selected on the host computer and downloaded to the camera along with text. In this case, the "favorite" image might be surrounded with one of the border and captions provided via the host PC 10, as shown in FIG. 3.

The user can then take or mail the image memory card 36 containing the image files and order information (utilization file) to the print service provider 14. The provider reads the information, fills the print order, and returns the print order either for pick-up by the user or by mail. The service provider 14 charges the user's credit card account (which can be stored in the print order information file) for the prints provided. Alternatively, the user can place the card 36 in a slot 50 of a "walk-up kiosk" 16 along with a credit card. The kiosk can then automatically produce the prints required while minimizing the amount of user interaction required. Finally, the user could place the card in a home printer 48, and the printer could automatically produce the quantity of prints of each image required. In the last two cases, the size and quality of print types available might be limited to those available by the kiosk 16 or the home printer 48.

Alternatively, the camera 12 could incorporate or be connected to a wired or wireless modem, such as the communications interface 28. In this case, the print order information, and the image information needed to fulfill the print order, would be transmitted to the service provider 14 along with the account information through the communication network 31 (which could be a wired or wireless network). The service provider 14 would print the order and mail the prints back to the user.

Instead of, or in addition to, composing a print order, the user may choose to transmit one or more images to others. These images can include the "creative" images and/or text described above. The user selects the images and the person (s) who will receive them, from the group of addresses loaded into the camera 12 via the process described earlier (the software application running on the home PC 10). The e-mail order information is provided in the utilization file that gives the e-mail address and includes pointers to the image files that store the images required to "fulfill" the e-mail order.

If the camera 12 includes a transmitter, e.g., a cellular connection in the communications interface 28, the camera 12 could include and initiate a "send" command that the user would enable after completing the e-mail order. This command would automatically send the appropriate images to the appropriate user's e-mail accounts through the network 31 using the appropriate communications protocol (i.e., FTP, mailto). Alternatively, the camera 12 can be placed in a docking unit (not shown) containing the modem. The images can then be automatically transmitted to the service provider 14, when the camera 12 is inserted into the dock. Alternatively, the memory card 36 could be removed from the camera 12 and placed in a kiosk, which would then transmit the images and bill the user's charge card.

Instead of, or in addition to, composing a print order and/or an e-mail order, the user may choose to transmit one or more images to their "electronic photo album" account, which could be maintained by the service provider 14(or alternatively could be maintained on the user's home computer 10) in an image "album" storage 52. In this case, the user selects the images to be transferred to their photo album, and optionally selects what group of users might be allowed to view the images. The groups may include "Self only", "Self plus immediate family only", and "All" (i.e., family, friends) The information may include text, which may be input and selected as described in U.S. Pat. No. 5,633,678, "An Electronic Still Camera for Capturing and Categorizing Images", filed Dec. 20, 1995, and assigned to the assignee of the present application, the disclosure of which is herein incorporated by reference.

Instead of having the camera 12 communicate directly to the "downstream" service provider 14 over the communications network 31, the communications network 31 from the camera 12 could alternatively be connected to an internet service provider (ISP) (not shown) such as AOL (America On Line), Earthlink, and Eznet. The "downstream" service provider 14 would then be connected to all ISPs via the internet, eliminating the need to maintain a separate communications network. The ISP would transfer the utilization file data and images needed to order prints and album images to the downstream service provider. The ISP could itself handle e-mailing of images to other users, using the data and images in the utilization file.

Figures 4, 5:
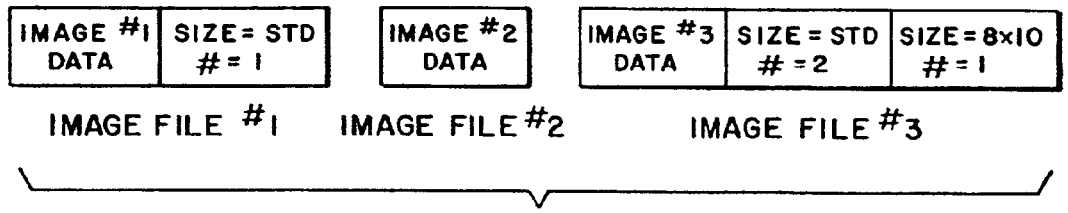
FIG. 4 is a diagram of the organization of a utilization file.
FIG. 5 is a diagram of another organization of a utilization file together with each image file.

The utilization order information is provided in the utilization file. The general file organization is shown in FIG. 4, and a detailed example of the file contents of an elaborate utilization file is given in Appendix I. This file may be encrypted to prevent unauthorized use of the sensitive information, such as the user's credit card number. Referring to Appendix I, a Global information section (lines 2–26) provides the customer information (name, address, credit card), as well as the time the order was placed, and whether it has been processed or not.

The file may contain one or more Print Order sections. For example, lines 28–37 describe a print order of "standard" size (4"×6") prints of the images made on a silver halide based CRT printer. Line 34 indicates that two copies of the image referenced in line 33 will be printed, while only one copy of the images referenced in lines 35–36 is printed. A second print order section (lines 39–55) indicates a large size print (24"×36") should be made on a silver halide printer and mounted in particular in a walnut frame. This printer should be sent via UPS to the address shown in lines 47–52. The image is the composite shown in FIG. 3, which is described in the CreativeDetail section (lines 76–90).

An e-mail order section (lines 57–65) provides the e-mail address and a list of images that should be sent to this address. An album order section (lines 67–72) provides a means for adding images to the users on-line photo album. The user can classify the images under a particular heading (e.g., "vacation" images) and indicate who is allowed to access the images via the internet.

A Creative Detail section (lines 74–90) defines each creative image, such as the image in FIG. 3. It also describes user defined text (line 81). Multiple templates and user text options may be downloaded from the host computer to a memory card 36 that is then inserted into the camera 12, prior to taking pictures. The template (background) may be an identification code that is only added, for example, during printing. In this case, the template is not viewed when the image is displayed on the camera 12. Alternatively, a low resolution version of the templates desired by the user can be stored in the camera 12, so that the user can preview the final composite image. A high resolution version of the template can be used by the service provider to print the final composite image. The user may decide to crop and rotate the image (lines 86–87) prior to inserting it into the creative background.

Finally, an image detail section (92–102) describes the file type (e.g., FlashPix, JPEG, TIFF) and location of each image. In this example, the three images are all FlashPix images located on the memory card "Local Card" in the "vacation" folder.

Most of the information in GlobalInfo and CreativeDetail sections of the digital camera utilization file, for example the addresses and creative text, is downloaded from the host computer to the camera prior to picture taking. After reviewing the images, the user uses the image LCD and user interface to select which images to print, e-mail, and album. The print size, e-mail, albuming, and creative options are offered by pull-down menus that match the options provided by the service providers they have selected on the computer and downloaded to the camera 12 (via the memory card 36). The full utilization file (i.e., Print order, e-mail order) is then created by the camera based on the user selections.

A much simpler print utilization file is shown in Appendix II. In this case, the camera 12 simply allows a print order to be created. The memory card 36 containing the images and the simple utilization file is then inserted into the home PC 10, the home printer, or the walk-up kiosk 16 or sent to a service provider via a communications interface. The proper number of each selected image is then automatically printed, without further user intervention.

Instead of providing the utilization information for multiple images in a single utilization file, other embodiments are possible. For example, the camera may create three utilization files, one containing the information needed to produce a print order, a second containing information needed to provide electronic albuming, and a third containing e-mail order information. Alternatively, the utilization information may be provided with each image file, as shown in FIG. 5. In this embodiment, the print order information describing the number and size of each image to be printed is included in tags provided within each image file. For example, image file #1 contains the image data and a tag indicating that the user has requested one standard size print. Image file #2 does not contain a print tag (or alternatively could include a tag with the number of prints set equal to zero) so no prints will be made of image #2. Image file #3 includes a first print tag indicating that the user has requested two standard size prints, and a second tag indicating that the user has also requested a single 8"×10" size enlargement.

The invention has been described with reference to a preferred embodiment. However, it will be appreciated that variations and modifications can be effected by a person of ordinary skill in the art without departing from the scope of the invention.

APPENDIX I

DIGITAL CAMERA UTILIZATION FILE

```
00000000 UTILIZATION ORDER SPECIFICATION (Non-zero initial number identifies encryption
         key)
%Section: GlobalInfo
    %Section: ConsumerInfo (Provides info on camera owner and default mailing address)
        %Name: ~Smith~~John~~W~
        %Consumer ID: Njj1007
        %Address:           ~1 Picture Avenue~
                            ~Apartment 8b~
                            ~PO Box 123~
                            ~Anytown~
                            ~State~
        %PostalCode:~14650~
        %CountryCode:USA
        %Email:~jdoe@kodak.com~
        %PhoneDay: ~(716) 555-1111~
        %PhoneNight: ~(716) 555-2222~
```

APPENDIX I-continued

DIGITAL CAMERA UTILIZATION FILE

```
        %CreditCardExpDate: 1996 03 24
        %CreditCardNumber: 3030445643345
        %CreditCardType: AmericanExpress
    %EndSection: ConsumerInfo
    %Section: OrderInfo    (Provides information on when utilization file was created)
        %Date: 1996 2 28
        %Time: 14 22 29
        %Processed: 0    (1 Indicates that this utilization order was processed)
    %EndSection: OrderInfo
%EndSection: GlobalInfo
%Section: PrintOrder    (Lists the images in a print order)
    %Section: FinishInfo
        %ImageOutputSize: 4 6 Inches (This example is for standard size prints)
        %MediaClass: AgX 20 EN34 Glossy
    %EndSection: FinishInfo
        %ImageRef: ImageDetail1 (Points to images defined below)
        %Quantity:2    (Optionally indicates number of copies, default=1)
        %ImageRef: ImageDetail2
        %ImageRef: ImageDetail3
%EndSection: PrintOrder
%Section: PrintOrder
    %Section: FinishInfo
        %ImageOutputSize: 24 36 Inches (This example is for a large creative print)
        %MediaClass: AgX 20 EN34 Glossy
        %FrameType: F134 Walnut
    %EndSection: FinishInfo
    %Section: ShippingInfo (Instructions to ship to an address other than the one in
        GlobalInfo)
        %ShippingCarrier: UPS
        %Name: ~Good~~Johnny~~B~
        %Address:        ~1 Song Street~
                         ~Mytown~
                         ~State~
        %PostalCode: ~00111~
        %CountryCode: USA
    %EndSection: ShippingInfo
    %ImageRef: CreativeDetail1    (Points to creative defined below)
%EndSection: PrintOrder
%Section: EmailOrder    (Sends images via e-mail)
    %Section: AddressInfo (Instructions to ship to an address other than the one in
        GlobalInfo)
        %Name: ~Good~~Johnny~~B~
        %Email: ~jgood@localnet.net~
    %EndSection: AddressInfo
    %ImageRef: Creative Detail1    (Points to creative defined below)
    %ImageRef: ImageDetail2
    %ImageRef: ImageDetail3
%EndSection: EmailOrder
%Section: AlbumOrder    (Add these images to on-line photo album)
    %AlbumHeading: ~Vacation images~ (Place images under "vacation" album heading)
    %AlbumViewing: All    (gives access to all authorized album viewers)
    %ImageRef: CreativeDetail1    (Points to creative defined below)
    %ImageRef: ImageDetail2
%EndSection: AlbumOrder
%Section: CreativeDetail 1    (Describes each composite image)
    %LayoutRef: T12345    (Indicates template ID or template image file)
    %Section: PageInfo
        %PageRef: 0
        %Section: TextInfo    (Indicates what text appears in the template)
            %TextNodeRef: 1
            %ConsumerText: ~Hi, I'm having a relaxing time on vacation. John Smith
        %EndSection: TextInfo
        %Section:ImageInfo    (Indicates which images(s) appear in template)
            %ImageNodeRef: 2
            %ImageDetailRef: 1
            %CropRect: 256 0 768 1280 (Cropped image top, left, width, height)
            %Rotate: 90 (Indicates rotation in degrees clockwise)
        %EndSection: ImageInfo
    %EndSection: PageInfo
%EndSection: CreativeDetail
%Section: ImageData (Describes each image, may be referenced multiple times)
    %Section: ImageDetail 1
        %FileType: FlashPix Version 2.0
        %ImageLocation: LocalCard~Vacation/Image4.FPX~
    %Section: ImageDetail 2
        %FileType: FlashPix Version 2.0
        %ImageLocation: LocalCard~Vacation/Image7.FPX~
```

APPENDIX I-continued

DIGITAL CAMERA UTILIZATION FILE

%Section: ImageDetail 3
    %FileType: FlashPix Version 2.0
    %ImageLocation: LocalCard~Vacation/Image10.FPX~
%EndSection: ImageData

APPENDIX II

SIMPLE PRINT ORDER UTILIZATION FILE

| %Section: PrintOrder | | (Lists the images in a print order) |
|---|---|---|
| Image4.FPX | 1 | (One copy of image 4) |
| Image7.FPX | 2 | (Two copies of image 7) |
| Image10.FPX | 1 | |
| Image12.FPX | 4 | |
| Image13.FPX | 1 | |
| %EndSection: PrintOrder | | |

What is claimed is:

1. An electronic still camera for capturing images to be transferred to at least one e-mail address, the electronic still camera comprising:

(a) an image sensor for capturing a plurality of images of scenes and for producing image signals representative of the corresponding scenes;

(b) an analog-to-digital converter for digitizing the image signals to produce digital images;

(c) a removable memory card for storing a plurality of digital image files corresponding to the digital images;

(d) an internal memory for storing at least one digital image to be displayed and a plurality of e-mail addresses;

(e) a processor for controlling the transfer of the digital images from the removable memory card to the internal memory and for producing a utilization file;

(f) a display coupled to the internal memory for displaying at least one digital image; and (g) a user interface for selecting at least one e-mail address and for scrolling through the plurality of digital images stored on the removable memory card in order to display and select particular digital images to be transferred to the selected at least one e-mail address, wherein the utilization file includes the at least one selected e-mail address and the name of at least one digital image file to be transferred to the at least one selected e-mail address and the processor stores the utilization file on the removable memory card separate from the digital image files.

2. The electronic still camera as claimed in claim 1 wherein the user interface further enables selection of particular digital image files to be printed, and the utilization file further includes the names of at least one digital image file to be printed by a separate printing device.

3. The electronic still camera as claimed in claim 1 further including a communications interface which interfaces to a communications network for transferring the selected digital image files to the at least one selected e-mail address.

4. The electronic still camera as claimed in claim 3 wherein the communications interface includes a transmitter.

5. The electronic still camera as claimed in claim 4 wherein the transmitter provides a cellular connection.

6. The electronic still camera as claimed in claim 4 wherein the electronic still camera provides a send command to initiate transfer of the selected digital image files to the at least one selected e-mail address using the transmitter.

7. The electronic still camera as claimed in claim 1 further including a separate docking unit having a modem for transferring the selected digital image files to the at least one selected e-mail address.

8. The electronic still camera as claimed in claim 7 wherein the selected digital image files are transmitted to a service provider, and the service provider then transfers the selected digital image files to the at least one selected e-mail address.

9. The electronic still camera as claimed in claim 1 wherein the utilization file further includes the file type of each digital image file.

10. The electronic still camera as claimed in claim 9 wherein the file type of at least one digital image file is a JPEG file type.

11. The electronic still camera as claimed in claim 1 wherein the utilization file further includes a camera owner name and a mailing address of such camera owner.

12. The electronic still camera as claimed in claim 11 wherein the utilization file further includes a credit card number of the camera owner.

13. A method for capturing digital images to be transferred to at least one e-mail address, comprising the steps of:

(a) storing a plurality of e-mail addresses in a digital memory;

(b) capturing a plurality of images of scenes and producing image signals representative of the corresponding scenes;

(c) digitizing the image signals to produce digital images;

(d) storing a plurality of digital image files corresponding to the digital images on a removable memory card;

(e) providing a user interface for selecting at least one e-mail address and for scrolling through the plurality of digital images stored on the removable memory card in order to display and select particular digital images to be transferred to the selected at least one e-mail address;

(f) in response to a user selecting particular digital images to be transferred, producing a utilization file and storing the utilization file on the removable memory card separate from the digital image files, wherein the utilization file identifies the at least one selected e-mail address and identifies at least one digital image file to be transferred to the selected at least one e-mail address.

14. The method as claimed in claim 13 wherein the user interface further enables selection of particular digital image files to be printed, and the utilization file further includes the names of at least one digital image file to be printed by a separate printing device.

15. The method as claimed in claim 13 further including the step of interfacing to a communications network and transferring the selected digital image files to the at least one selected e-mail address.

16. The method as claimed in claim 15 wherein the communications network includes a cellular transmitter.

17. The method as claimed in claim 13 wherein the selected digital image files are transmitted to a service provider, and the service provider then transfers the selected digital image files to the at least one selected e-mail address.

18. The method as claimed in claim 13 wherein the utilization file further includes the file type of each digital image file.

19. The method as claimed in claim 18 wherein the file type of at least one digital image file is a JPEG file type.

20. The method as claimed in claim 13 wherein the utilization file further includes a camera owner name and a mailing address of such camera owner.

21. The method as claimed in claim 20 wherein the utilization file further includes a credit card number of the camera owner.

* * * * *